United States Patent [19]

Riegel

[11] 3,879,482

[45] Apr. 22, 1975

[54] VINYL CHLORIDE PROCESS

[75] Inventor: Herbert Riegel, Maplewood, N.J.

[73] Assignee: The Lummus Company, Bloomfield, N.J.

[22] Filed: June 28, 1971

[21] Appl. No.: 157,496

Related U.S. Application Data

[63] Continuation-in-part of Ser. No. 831,414, June 9, 1969, abandoned, which is a continuation-in-part of Ser. No. 614,338, Feb. 6, 1967, abandoned, and a continuation-in-part of Ser. No. 769,811, Oct. 23, 1968, abandoned.

[52] U.S. Cl....... 260/656 R; 260/654 R; 260/659 R
[51] Int. Cl............................................. C07c 21/02
[58] Field of Search..................... 260/656 R, 659 A

[56] References Cited
UNITED STATES PATENTS

| | | | |
|---|---|---|---|
| 2,407,828 | 9/1946 | Gorin | 260/659 |
| 3,214,481 | 10/1965 | Heinemann et al. | 260/656 |
| 3,501,539 | 3/1970 | Olson et al. | 260/656 |

FOREIGN PATENTS OR APPLICATIONS

| | | | |
|---|---|---|---|
| 734,131 | 7/1955 | United Kingdom | 260/656 |

*Primary Examiner*—Leon Zitver
*Assistant Examiner*—A. Seigel
*Attorney, Agent, or Firm*—Marn & Jangarathis

[57] ABSTRACT

Process for producing vinyl chloride from ethane by contacting, in a first reactor, ethane and chlorine and/or hydrogen chloride, as fresh feed, and as recycle, hydrogen chloride, ethyl chloride, ethylene and unconverted ethane with a molten mixture including cuprous chloride, cupric chloride and copper oxychloride to produce a reactor effluent including vinyl chloride, dichloroethane (primarily 1,2-dichloroethane) and the aforementioned recycle components. The vinyl chloride is recovered as product, the recycle components are recovered and recycled to the first reactor and the dichloroethane is recovered as reaction product or recovered and dehydrochlorinated to vinyl chloride. The molten mass from the first reactor is contacted in a second reactor with molecular oxygen to generate copper oxychloride and melt from the second reactor is passed to the first reactor. Ethyl chloride may be employed as fresh feed instead of ethane and chlorine and/or hydrogen chloride, in which case, there is no recycle ethane.

40 Claims, 3 Drawing Figures

INVENTOR
Herbert Riegel
BY Marn & Jangarath

INVENTOR
Herbert Riegel
BY Marn & Jamgarathu

VINYL CHLORIDE PROCESS

This application is a continuation-in-part of application Ser. No. 831,414 filed on June 9, 1969, the aforementioned application being a continuation-in-part of application Ser. No. 614,338 filed on Feb. 6, 1967 and is also a continuation-in-part of application Ser. No. 769,811 filed on Oct. 23, 1968 all abandoned.

This invention relates to the production of vinyl chloride, and more particularly to the production of vinyl chloride from ethane and/or ethyl chloride.

In general, vinyl chloride is produced from ethylene by contacting ethylene with chlorine to produce 1,2-dichloroethane, followed by dehydrochlorination of 1,2-dichloroethane to vinyl chloride. There is a commercial need for an effective process for producing vinyl chloride from other feedstocks in that, in many cases, an ethylene feedstock is uneconomical.

An object of this invention is to provide a new and improved process for producing vinyl chloride.

Another object of this invention is to provide a new and improved process for producing vinyl chloride from ethane and/or ethyl chloride.

These and other objects of the invention should be more readily apparent from reading the following detailed description of the invention with reference to the accompanying drawings, wherein.

Figure 1:
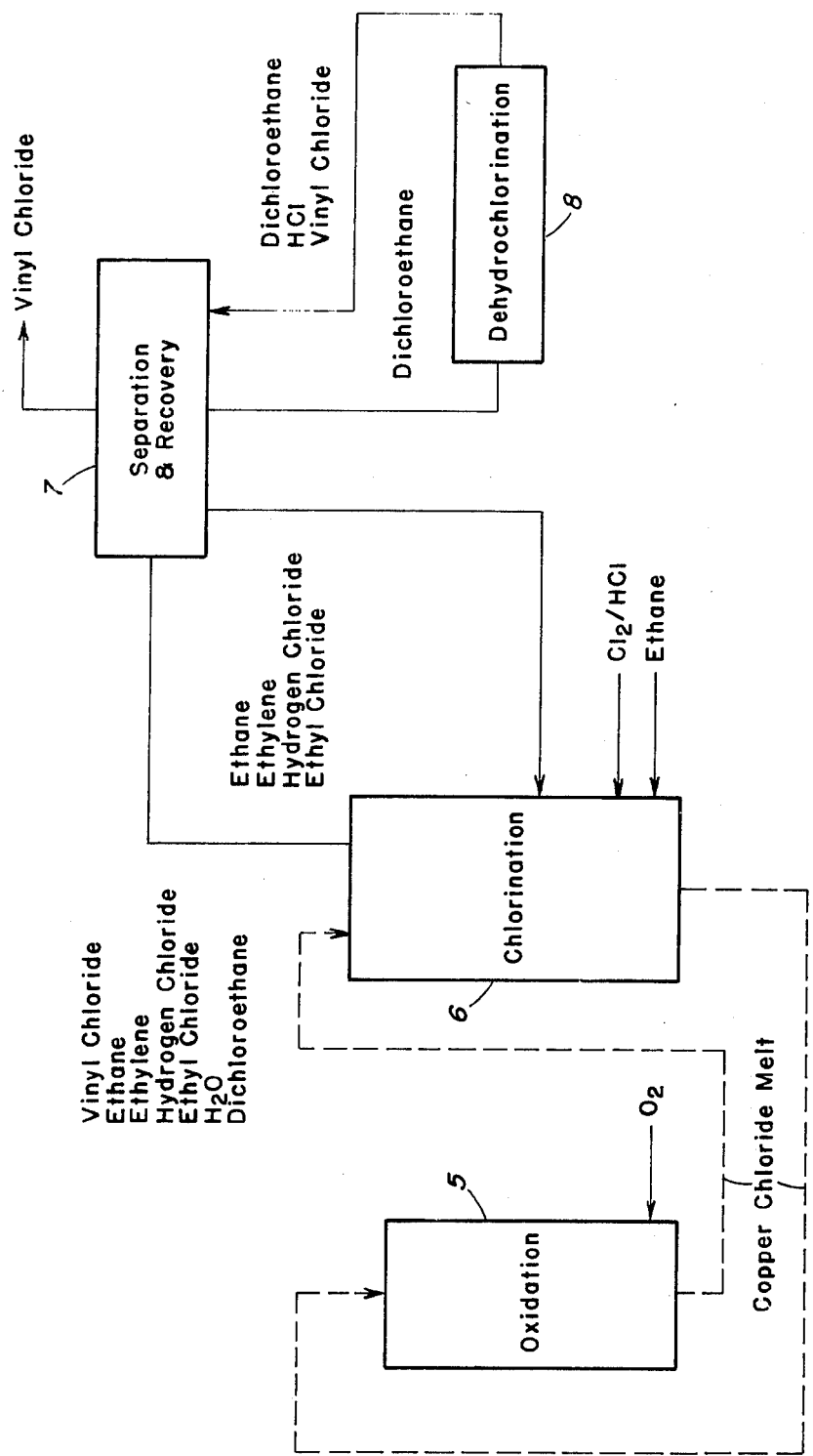
FIG. 1 is a block diagram of the overall process of the invention.

In accordance with one aspect of the present invention, ethane and chlorine and/or hydrogen chloride, as fresh feed, and as recycle, ethyl chloride, ethylene, and unconverted ethane are contacted with a molten mixture including a multivalent metal chloride in both its higher and lower valence state and the oxychloride of the metal, to produce a chlorination reaction effluent which includes vinyl chloride, dichloroethane (the dichloroethane reaction product is generally a mixture of 1,2-dichloroethane and 1,1-dichloroethane, primarily 1,2-dichloroethane. It is to be understood however, that in some cases, the dichloroethane could be comprised of essentially only 1,2-dichloroethane. As hereinafter employed, dichloroethane generically refers to 1,2-dichloroethane and/or 1,1-dichloroethane). The chlorination reaction effluent is introduced into a separation and recovery zone wherein vinyl chloride is recovered as product, ethyl chloride, ethylene and ethane are recovered and recycled to the chlorination reaction for ultimate conversion to vinyl chloride. The dichloroethane is either recovered as co-reaction product or recovered and dehydrochlorinated to vinyl chloride. Thus, in accordance with this one aspect of the present invention, ethane is chlorinated to vinyl chloride, with the reaction intermediates also being ultimately converted to vinyl chloride.

In accordance with another aspect of the present invention, ethyl chloride, as fresh feed, and as recycle, ethyl chloride and ethylene are contacted with a molten mixture including a multivalent metal chloride, in both its higher and lower valence state and the oxychloride of the metal, to produce a reaction effluent which includes vinyl chloride, dichloroethane (1,1- and 1,2-dichloroethane), unconverted ethyl chloride and ethylene. The reaction effluent is introduced into a separation and recovery zone wherein vinyl chloride is recovered as product, ethyl chloride and ethylene are recovered and recycled for ultimate conversion to vinyl chloride. The dichloroethane is recovered either as a reaction product or recovered and dehydrochlorinated to vinyl chloride. Thus, in accordance with this another aspect of the present invention, ethyl chloride is converted to vinyl chloride with the reaction intermediates also being ultimately converted to vinyl chloride.

The melt contains a chloride of a multivalent metal; i.e., a metal having more than one positive valence state, such as, manganese, iron, copper, cobalt, and chromium, preferably copper. In the case of higher melting multivalent metal chlorides, such as copper chlorides, a metal salt melting point depressant which is non-volatile and resistant to oxygen at the process conditions, such as a chloride of a univalent metal; i.e., a metal having only one positive valence state, is added to the multivalent metal chloride to form a molten salt mixture having a reduced melting point. The univalent metal chlorides, are preferably alkali metal chlorides, such as potassium and lithium chloride in particular, but it is to be understood that other metal chlorides and mixtures thereof, such as the heavy metal chlorides (heavier than copper) of Groups I, II, III and IV of the Periodic Table; e.g., zinc, silver, and thallium chloride, may also be employed. The metal chloride melting point depressant is added in an amount sufficient to maintain the salt mixture as a melt at the reaction temperatures and is generally added in an amount sufficient to adjust the melting point of the molten salt mixture to a temperature of below about 500°F. In the case of a salt mixture of copper chloride and potassium chloride, the composition of the melt ranges from about 20 percent to about 40 percent, preferably about 30 percent, by weight, potassium chloride, with the remainder being copper chlorides. It is to be understood, however, that in some cases the catalyst melt may have a melting point higher than 500°F., provided the catalyst remains in the form of the melt throughout the processing steps. It is further to be understood that the melt may contain a mixture of multivalent metal chlorides or other reaction promoters. It is also to be understood that in some cases, the metal chloride may be maintained as a melt without the addition of a melting point depressant.

The reaction sequence for chlorinating ethane to vinyl chloride, in the chlorination zone, using copper chloride as a representative multivalent metal chloride, is believed to be best represented by the following equations:

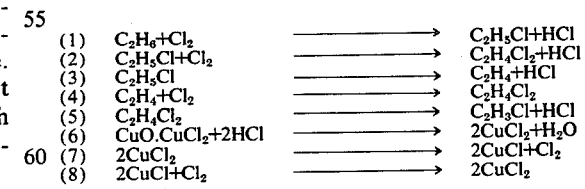

(1) $C_2H_6 + Cl_2 \longrightarrow C_2H_5Cl + HCl$
(2) $C_2H_5Cl + Cl_2 \longrightarrow C_2H_4Cl_2 + HCl$
(3) $C_2H_5Cl \longrightarrow C_2H_4 + HCl$
(4) $C_2H_4 + Cl_2 \longrightarrow C_2H_4Cl_2$
(5) $C_2H_4Cl_2 \longrightarrow C_2H_3Cl + HCl$
(6) $CuO \cdot CuCl_2 + 2HCl \longrightarrow 2CuCl_2 + H_2O$
(7) $2CuCl_2 \longrightarrow 2CuCl + Cl_2$
(8) $2CuCl + Cl_2 \longrightarrow 2CuCl_2$ Thus, the various reactions which are believed to be effected during the chlorination provide for chlorination of ethane to vinyl chloride, and effective utilization of the reaction intermediates, ethyl chloride, ethylene and hydrogen chloride by ultimate conversion thereof to vinyl chloride. It should also be apparent that the hereinabove equations, except for equation (1), are also representative of the process for producing vinyl chloride from ethyl chloride as fresh feed. The reaction for producing vinyl chloride from either ethane and/or ethyl chloride, as fresh feed, is hereinafter sometimes referred to as a "chlorination reaction" even though reactions other than chlorination occur.

The oxychloride of the multivalent metal which is present in the melt may be generated by previously contacting the melt with molecular oxygen, with the reaction being represented by the following equation:

9. $2CuCl + 1/2 O_2 \longrightarrow CuO \cdot CuCl_2$

The generated hydrogen chloride reacts with the copper oxychloride of the melt, as represented by the following equation:

10. $CuO \cdot CuCl_2 + 2HCl \rightarrow 2CuCl_2 + H_2O$

The overall reaction for producing vinyl chloride from ethane and chlorine and/or hydrogen chloride is represented by the following overall equations:

(11) $C_2H_6 + 1/2 Cl_2 + 3/4 O_2 \longrightarrow C_2H_3Cl + 3/2 H_2O$

(12) $C_2H_6 + HCl + O_2 \longrightarrow C_2H_3Cl + 2H_2O$

Accordingly, the present invention provides a process for producing vinyl chloride from ethane with essentially all of the ethane and chlorine and/or hydrogen chloride, added as fresh feed, being ultimately converted to vinyl chloride. The overall reaction for producing vinyl chloride from ethyl chloride is represented by the following overall equation:

13. $C_2H_5Cl + 1/2 O_2 \longrightarrow C_2H_3Cl + H_2O$

Accordingly, the present invention also provides a process for producing vinyl chloride from ethyl chloride with essentially all of the ethyl chloride being ultimately converted to vinyl chloride.

The dichloroethane (primarily 1,2-dichloroethane and generally also varying amounts of 1,1-dichloroethane) generated during the chlorination is recovered as product or dehydrochlorinated to vinyl chloride at dehydrochlorination temperatures and pressures. The dehydrochlorination may be effected in any of a wide variety of ways. Thus, for example, the dichloroethane may be introduced into a dehydrochlorination zone, of a type known in the art, and thermally or catalytically dehydrochlorinated to vinyl chloride. Alternatively, the dichloroethane may be recovered and dehydrochlorinated by introducing the dichloroethane into the chlorination reaction zone. As a further alternative, the dichloroethane may be recovered and dehydrochlorinated by contacting thereof with a molten mixture of a multivalent metal chloride in both its higher and lower valence state, as described in the aforementioned Application Ser. No. 831,414 or Application Ser. No. 614,338. In any case, the hydrogen chloride which is released during the dehydrochlorination is preferably recovered and recycled to the chlorination zone to insure recovery of essentially all chlorine values.

The chlorination reaction for producing vinyl chloride from ethane and/or ethyl chloride may be effected at temperatures from about 700°F. to about 1200°F. and at pressures from about 1 to about 20 atmospheres. The chlorination reaction is preferably effected at temperatures from about 750°F. to about 1000°F. and more preferably from about 800°F. to about 900°F. in that such temperature conditions, in combination with the other processing conditions, have been found to provide improved yields of vinyl chloride. The contacting of the feed and melt is generally effected in a countercurrent fashion, preferably with the feed as a continuous vapor phase, at residence times from about 1 to about 60 seconds, although longer residence times may be employed.

The molten mixture introduced into the chlorination zone generally contains from about 0.5 percent to about 5.5 percent preferably from about 1 percent to about 3 percent, all by weight, of the oxychloride, preferably copper oxychloride, and at least about 16 percent of the higher valent metal chloride, preferably from about 18 percent to about 50 percent and more preferably from about 20 percent to about 35 percent, all by weight, of the higher valent metal chloride, with the higher valent metal chloride preferably being cupric chloride. The remainder of the melt is comprised of the lower valent metal chloride and the melting point depressant, preferably potassium chloride. In the case of a molten mixture of cuprous chloride, cupric chloride, potassium chloride and copper oxychloride, the copper oxychloride and cupric chloride are present in the amounts hereinabove described, the potassium chloride in an amount from about 20 percent to about 40 percent, by weight, with the remainder being cuprous chloride, based on the four components. As a result of the various reactions which are effected during the process, the cupric chloride content of the melt does not significantly vary through the various reaction zones. The molten salt is circulated at a rate to provide a molten salt to feed weight ratio (based on total feed; i.e., including recycle to the chlorination zone) from about 25:1 to about 200:1, and preferably from about 50:1 to about 125:1.

In using ethane, as fresh feed, the ethane and chlorine are preferably introduced into the chlorination zone in amounts approximating stoichiometric proportions in order to eliminate the necessity for chlorine recovery and recycle, generally in amounts to provide a chlorine to ethane fresh feed weight ratio from about 1.0:1 to about 1.2:1. The ethyl chloride recycled to the chlorination zone is in an amount to provide an ethyl chloride to ethane fresh feed weight ratio from about 0.3:1 to about 14:1, preferably from about/x:1 to about 8:1, and the ethylene is recycled to provide an ethylene to fresh feed ethane weight ratio from about 0.03:1 to about 1.2:1, preferably from about 0.1:1 to about 1.:1. In the case where hydrogen chloride is used as the chlorinating agent, either with or without chlorine, the fresh feed hydrogen chloride is also preferably used in about stoichiometric proportions to minimize recycle.

The dichloroethane withdrawn from the chlorination reaction zone is recovered from the reaction effluent and preferably dehydrochlorinated to vinyl chloride. The dehydrochlorination of dichloroethane, as hereinabove noted, may be effected as known in the art, with the dehydrochlorination generally being effected at temperatures from about 700°F. to about 1200°F. The dehydrochlorination may be effected thermally in a suitable furnace as known in the art, or catalytically with any of the wide variety of known solid dehydrochlorination catalysts (in general even in thermal processes a minor portion of chlorine is added to the feed as a free radical generator). Alternatively, the dichloroethane may be dehydrochlorinated in a separate reaction zone using a molten salt mixture as described in the aforementioned Application Ser. No. 831,414 and Application Ser. No. 614,338. As a further alternative, the dichloroethane may be recycled to the chlorination reaction zone wherein the dichloroethane is dehydrochlorinated to vinyl chloride in accordance with equation (5). In view of the fact that the details of the dehydrochlorination reaction for dehydrochlorinating 1,2-dichloroethane and also 1,1-dichloroethane form no part of the present invention and that the dehydrochlorination of dichloroethane is well known in the art, no further discussion of this processing step is deemed necessary for a full understanding of the present invention.

The oxychloride of the melt, as hereinabove noted, is preferably provided by contacting a molten mixture including the multivalent metal chloride in both its higher and lower valence state with a molecular oxygen-containing gas, such as air, prior to introducing the molten mixture into the chlorination reaction zone. The contacting of the melt and oxygen may be effected at a temperature from about 600°F. to about 900°F., and preferably at a temperature from about 750°F. to about 870°F. The contacting of the oxygen and melt is effected at a rate to provide a molten mixture having a copper oxychloride content in the amounts hereinabove described. It is to be understood that minor amounts of chlorine and/or hydrogen chloride could also be introduced during oxidation of the melt, with such chlorine and/or hydrogen chloride reacting with the melt as defined in equations (8) and (10).

The molten salt mixture, in addition to functioning as a reactant and/or catalyst, is a temperature regulator. Thus, the circulating melt has a high heat absorption capacity, thereby preventing runaway reaction during the exothermic chlorination and oxygen contacting steps; the temperature fluctuation between the oxidation and chlorination zones is generally no greater than about 130°F., and in most cases, the temperature fluctuation is from about 15°F. to 50°F. In general, the overall chlorination and oxidation reaction provides a net exotherm and some cooling of the melt is required. The temperature of the melt may be regulated by adjusting the temperatures of the various feed streams whereby the absorbed heat of reaction is employed to heat the streams to reaction temperature. Alternatively, the temperature of the lift gas employed for transporting the melt can be regulated.

The overall process of the invention may be more fully understood by referring to the block diagram of FIG. 1. It is to be understood that the various reaction steps are effected at the conditions and in the manner hereinabove more fully described.

Referring now to FIG. 1, a molten salt mixture of a multivalent metal chloride in both its higher and lower valence state and a melting point depressant, preferably a molten mixture of cuprous chloride, cupric chloride and potassium chloride, is countercurrently contacted in an oxidation reactor 5 with molecular oxygen to convert a portion of the cuprous chloride to copper oxychloride.

The molten salt, now containing copper oxychloride, withdrawn from oxidizer 5, is introduced into a chlorinator 6 wherein the molten salt is contacted with ethane and chlorine and/or hydrogen chloride as fresh feed, and ethane, ethylene, hydrogen chloride and ethyl chloride recycled from a separation and recovery zone 7. The reactions effected in chlorinator 6, as hereinabove described, produce a reaction effluent including vinyl chloride, ethyl chloride, dichloroethane (primarily 1,2-dichloroethane and also 1,1-dichloroethane), ethylene, minor amounts of hydrogen chloride (if any), water vapor and unconverted ethane. The hydrogen chloride generated in situ reacts with the oxychloride of the melt.

The chlorination reaction effluent is introduced into a separation and recovery zone 7, of a type known in the art, wherein vinyl chloride is recovered as product; ethane, ethylene, and ethyl chloride are recovered and recycled to the chlorinator 6; and dichloroethane is recovered and passed to a dehydrochlorination reactor 8.

The dichloroethane is dehydrochlorinated in dehydrochlorination reactor 8 to produce an effluent containing vinyl chloride, hydrogen chloride and unconverted dichloroethane which is passed to the separation and recovery zone 7. The vinyl chloride is recovered as reaction product; the dichloroethane is recovered and recycled to the dehydrochlorinator; and the hydrogen chloride is recovered and recycled to the chlorinator 6. It is to be understood that the dehydrochlorination reaction effluent could be treated in a separation and recovery zone other than the separation and recovery zone for the chlorination reaction effluent.

The molten salt mixture withdrawn from chlorinator 6 is introduced into the oxidizer 5 for regeneration of oxychloride by reaction with molecular oxygen.

In the case where ethyl chloride is employed, as fresh feed, instead of ethane, no ethane or chlorine is introduced into chlorinator 6, and the recycle to chlorinator 6 does not contain ethane.

In the case where dichloroethane is recovered as product, the recycle to chlorinator 6 does not contain hydrogen chloride and the dehydrochlorination is eliminated.

Figure 2:
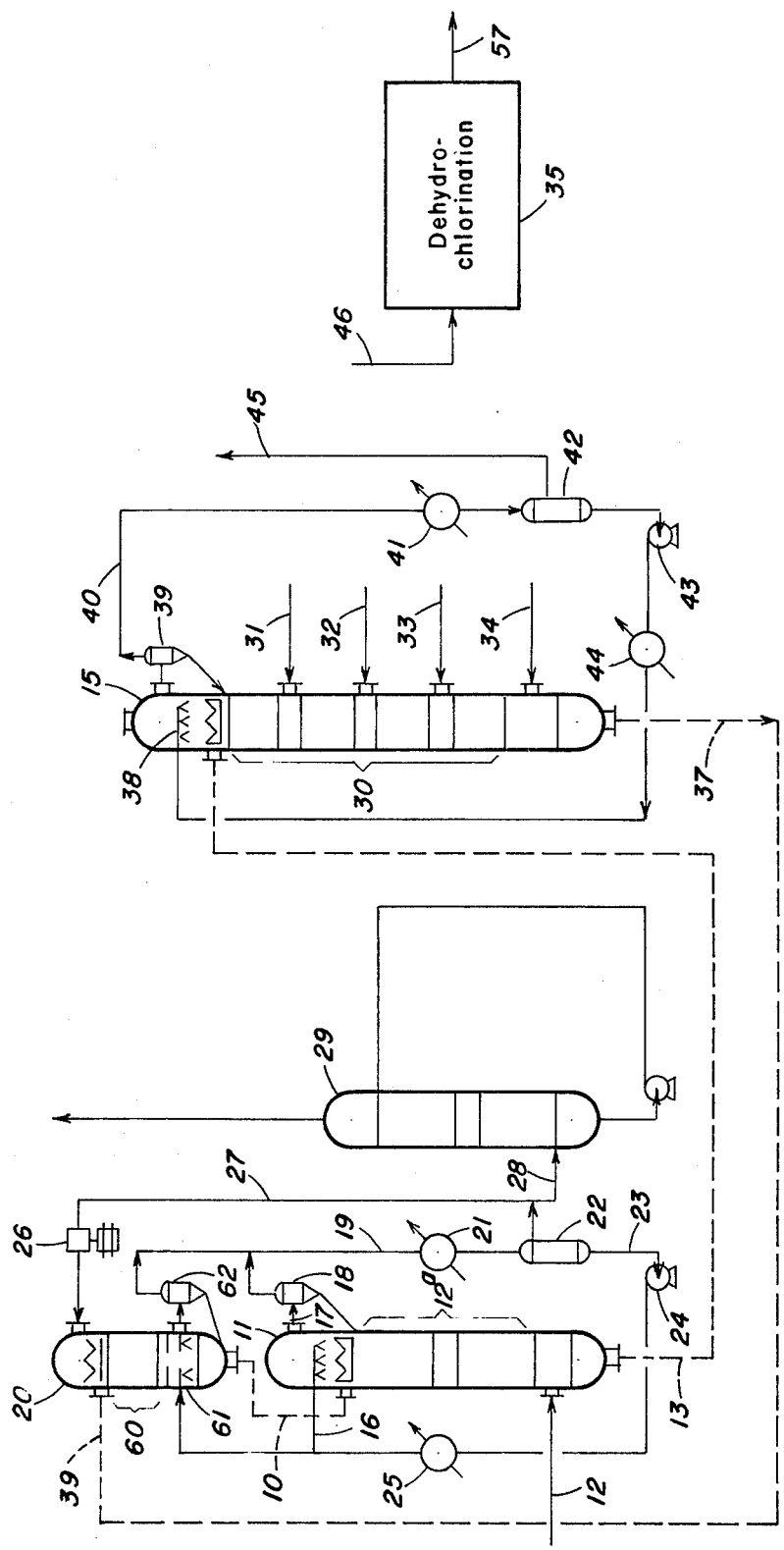
FIG. 2 is a simplified schematic flow diagram of the reaction section of an embodiment of the present invention.
Figure 3:
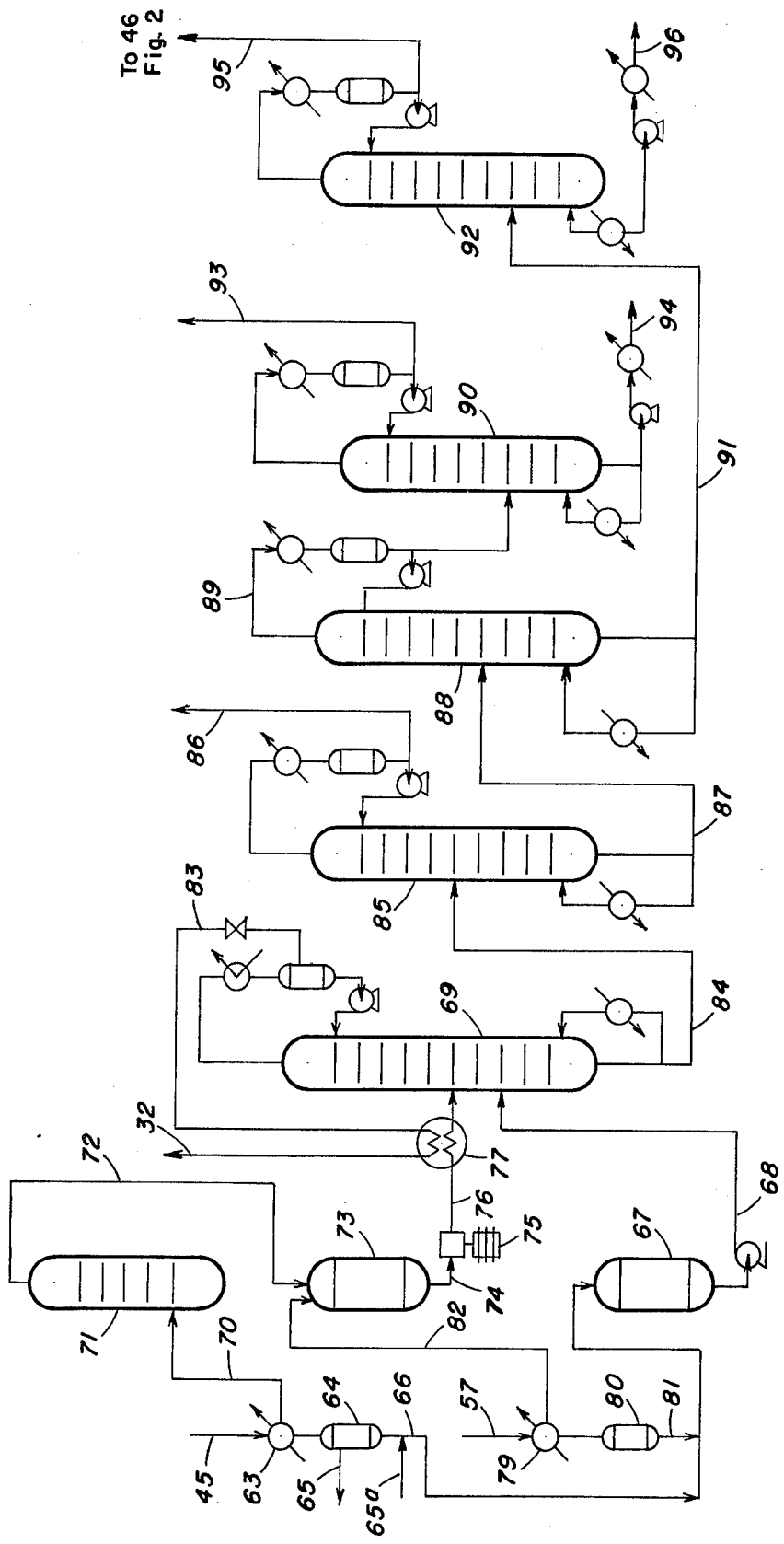
FIG. 3 is a simplified schematic flow diagram of the separation and recovery section of the embodiment of FIG. 2.

The process of the invention will now be further described with respect to a specific embodiment thereof which is illustrated in FIGS. 2 and 3 of the drawings but it is to be understood that the scope of the invention is not limited thereby. It is further to be understood that the molten chloride salts are highly corrosive and, accordingly, the processing equipment must be suitably protected; e.g., the reactors may be lined with ceramic. Similarly, if pumps are used for transporting the molten salts they must also be protected. The molten salts, however, are preferably transferred between the reactors by the use of gas lifts, as known in the art.

Referring now to FIG. 2, a molten chloride salt such as a mixture of potassium chloride, cupric and cuprous chloride in line 10 at a temperature of from 600°F. to 900°F. is introduced into the top of an oxidation vessel 11 maintained at a pressure of from about 1 to about 20 atms. A compressed oxygen-containing gas, such as air, in line 12 is introduced into the bottom of vessel 11 and is passed in countercurrent contact to the descending molten salt. The vessel 11 may be provided with one or more sections of packing, generally indicated as 12a, to promote intimate and effective contact between the compressed gas and molten salt. The molten salt is oxidized to produce oxychlorides, with the concurrent evolution of heat. The residence time of the molten salt within the vessel 11 is from about 1 to about 60 seconds.

The effluent gas leaving the packing near the top of vessel 11 is at a temperature of from about 600°F. to 900°F., and is contacted with a spray of a suitable quench liquid in line 16 obtained, for example, from one of the processing streams which is at a temperature of about 200°F. to 400°F. A suitable quench liquid would be water having dissolved hydrogen chloride. The gas is cooled by such contact with the result that vaporized and entrained salts are condensed and eliminated from the gas stream. The quench liquid spray is concurrently vaporized and, together with the effluent gas, in withdrawn from the top of vessel 11. The total gaseous effluent is passed through line 17 to a cyclone separator 18 for the elimination of any solid material which is returned to the vessel 11. The gaseous effluent is thereafter combined with another gaseous effluent in line 19 as more fully hereinafter described. The combined gaseous effluent is cooled to about 100°F. to 150°F. in heat exchanger 21 to condense out the vaporized quench liquid. The condensed quench liquid is separated from the remaining gaseous effluent in vapor/liquid separator 22. The quench liquid is passed through line 23 by pump 24 to heat exchanger 25 to cool the quench liquid to a temperature of about 100°F., with a portion being returned to the upper portion of vessel 11. The gaseous effluent in separator 22 is divided with a portion being passed through line 28 into a caustic scrubber 29. From scrubber 29, inert gases, such as nitrogen introduced with the oxygen in the oxygen-containing feed gas are readily discharged from the reactor system.

The molten salt, now containing the copper oxychloride, at a temperature of from about 700°F. to 1200°F. is withdrawn from the bottom of vessel 11 through line 13 and passed to the top of a reactor 15. The reactor 15 is operated at a temperature of from about 700°F. to about 1200°F., at a pressure of from 1 to 20 atms., and a residence time of 1 to 60 seconds. The reactor 15 is provided with sections of packing, generally indicated as 30, designed to effect intimate and effective contact between the gaseous feed components and the molten salt as more fully hereinafter described. Recycle ethyl chloride, as more fully hereinafter described, at a suitable temperature; e.g., from 100°F. to 200°F. or up to 800°F., is introduced into the upper portion of reactor 15 through line 31. Combined recycle components ethane, ethylene and hydrogen chloride at a suitable temperature; e.g., from 100°F. to 200°F. or up to 800°F. are introduced into reactor 15 through line 32 at a point below line 31. The introduction into reactor 15 of the recycle streams may be further divided, reversed in position, or may be combined into one stream. It is also to be understood that both recycle and fresh feed may be introduced at a single point at the bottom of the reactor.

Fresh chlorine and/or hydrogen chloride is introduced into reactor 15 through line 33 at a point below the recycle feed positions 31 and 32. Fresh feed ethane is introduced through line 34 into reactor 15 near the lower portion thereof. The hydrocarbon fresh feed in line 34 should be introduced at or near the bottom of the reactor 15.

The gaseous effluent at the top of the upper packed section in reactor vessel 15 is at a temperature between 7002 F. and 1200°F., and is cooled to about 300°F. by a spray of a suitable quench liquid in line 38 obtained, for example, from one of the processing streams. A suitable quench liquid would be one or more of the chlorinated hydrocarbons produced in reactor 15. Such temperature is above the dew point temperature of the combined gaseous reaction effluent and vaporized quench liquid. The total gaseous effluent is passed into cyclone separator 39 to remove any solids and is then passed through line 40 to condenser 41 to condense the quench liquid. The mixed vapor/liquid stream is introduced into separator 42 with the condensed quench liquid being passed by pump 43 to cooler 44 wherein the liquid is cooled to about 150°F. The cooled quench liquid is then passed to spray device 38 in reactor 15. The gaseous effluent from separator 42 at about 230°F. is passed through line 45 to a separation section illustrated in FIG. 3 as more fully hereinafter described.

The molten salt withdrawn from the bottom of reactor 15 is at a temperature of from about 700°F. to about 1200°F., and is passed through line 37 to the top of direct heat exchange vessel 20. Heat exchange vessel 20 comprises one or more packed sections, generally indicated as 60. A portion of the gas withdrawn from separator 22 through line 27, is compressed in compressor 26, and introduced into the top of heat exchange vessel 20 wherein the compressed gas is passed in direct heat exchange contact with the molten salt introduced through line 37. The gas and the molten salt are cocurrently passed over the packed sections 60 and are disengaged in the bottom of the heat exchange vessel 20. The gas is cooled by a spray of quench liquid through spray device 61 to eliminate any vaporized or entrained halide salt. A gaseous effluent comprised of the gas introduced through line 27 and now vaporized quench liquid is withdrawn from vessel 20 and passed into cyclone separator 62. In separator 62 any solids are removed from the gaseous effluent. The gaseous effluent withdrawn from separator 62 is passed through line 19 and combined with the gaseous effluent from oxidation vessel 11. The combined gaseous effluent is passed through condenser 21 to condense the quench liquid. The principal purpose of the heat exchange vessel 20 is to bring the molten salt in line 37 to a constant and desired temperature prior to introducing the molten salt into the top of oxidation vessel 11. In general, the overall reaction provides a net exotherm and, therefore, some cooling of the melt in vessel 20 is required.

Referring now to FIG. 3, the reactor effluent from reactor 15 in line 45 is comprised of vinyl chloride, hydrogen chloride (if any), dichloroethane, ethyl chloride, water and other chlorinated hydrocarbons. The reactor effluent is cooled to about 80°F. to 100°F. in condenser 63 primarily to condense water and heavier chlorinated hydrocarbons. The condensed water (which includes any hydrogen chloride present in the effluent) and heavier chlorinated hydrocarbons are introduced into a separator 64 to separate the water from the heavier chlorinated hydrocarbons. The water phase withdrawn from separator 64 through line 65 is neutralized and stripped of entrained and dissolved chlorinated hydrocarbon in a stripping column (not shown). The separated chlorinated hydrocarbons (from the stripping column) in line 65a is combined in line 66 with the heavier chlorinated hydrocarbons withdrawn from vessel 64 for subsequent processing.

The remaining portion of the reactor effluent gaseous stream, after cooling in condenser 63, is passed through line 70 into an absorption column 71 wherein any gases, principally any carbon dioxide present, are removed by any of several well-known acid gas absorption or adsorption systems. A gaseous effluent is withdrawn from absorption column 71 through line 72 and is passed into dryer 73 for removal of residual water.

An effluent vapor containing hydrogen chloride, vinyl chloride and dichloroethane in line 57, from a dehydrochlorination reactor 35, hereinafter described, is passed through a condenser 79 wherein the effluent vapor is cooled to about 80°F. to about 120°F. primarily to condense unconverted dichloroethane which is passed to vessel 80. The unconverted dichloroethane withdrawn from vessel 80 through line 81 is combined with chlorinated hydrocarbons in line 66. The combined stream is passed through dryer 67 and is introduced through line 68 into distillation column 69. The uncondensed gaseous effluent in condenser 79 is withdrawn through line 82 and is passed into dryer 73 wherein the uncondensed gaseous effluent is combined with gaseous effluent in line 72. The dried gas withdrawn from dryer 73 through line 74 is passed to compressor 75 and compressed to about 10 to about 30 atms. The compressed gas is thereafter passed through line 76 through heat exchanger 77 and is introduced into distillation column 69.

Distillation column 69 is operated at temperatures and pressures to produce a gaseous overhead comprised of ethane, ethylene and hydrogen chloride. The gaseous overhead in line 83 is passed through heat exchanger 77 and is introduced into reactor vessel 15, through line 32, as shown in FIG. 2. The column bottoms consisting of chlorinated hydrocarbons is passed through line 84 to a distillation column 85.

Distillation column 85 is operated at temperatures and pressures to form an overhead primarily comprised of vinyl chloride with minor amounts of impurities. The overhead in line 86 is passed to a purification system (not shown) to produce monomer grade vinyl chloride. The column bottoms from distillation column 85 is passed through line 87 to a distillation column 88.

Distillation column 888 is operated at temperatures and pressures to produce an overhead stream consisting of all remaining chlorinated hydrocarbons boiling below dichloroethane (both 1,1- and 1,2-dichloroethane). The overhead stream from column 88 is passed through line 89 into distillation column 90. The bottoms product from distillation column 88 containing dichloroethane and higher boiling chlorinated products is passed through line 91 into a distillation column 92.

Distillation column 90 is operated at pressures and temperatures designed to form an overhead stream substantially comprised of pure ethyl chloride which is passed through lines 93 and 31 to the reactor 15, as shown in FIG. 2. The bottoms from distillation column 90 consisting largely of dichloroethylenes is withdrawn from the system through line 94.

Distillation column 92 is operated at such temperatures and pressures designed to produce an overhead comprised substantially of pure dichloroethane. It is to be understood, however, that the overhead stream may also contain some dichloroethylenes, trichloroethylene and carbon tetrachloride. The overhead stream is passed through lines 95 and 46 to a dehydrochlorination reactor 35, schematically shown in FIG. 2. The bottoms stream from distillation column 92 consisting primarily of trichloroethylene, trichloroethane, perchloroethylene and tetrachloroethane, is withdrawn from the system, through line 96.

The dehydrochlorination reactor 35 may be any one of a wide variety of dehydrochlorination reactors; e.g., a furnace, and the reactor 35 is operated to produce a reaction effluent which includes vinyl chloride, hydrogen chloride and unreacted dichloroethane. The reaction effluent is withdrawn from reactor 35 through line 57 and passed to the separation and recovery section as hereinabove described. It should be readily apparent from the hereinabove description of the invention that a minor portion of the ethane and chlorine, introduced as fresh feed, is converted to chlorinated derivatives which are not ultimately converted to vinyl chloride; namely, one or more of the following: trichloroethanes, tetrachloroethane, dichloroethylenes, trichloroethylene and tetrachloroethylene. In most cases, there is not an available market for such chlorinated derivatives, and in such cases, chlorine values may be recovered by burning these derivatives. Thus, for example, the chlorinated derivatives recovered in line 94 and/or line 96 may be burned to produce a combustion effluent which contains hydrogen chloride and chlorine. The combustion effluent may then be introduced into reactor 11 wherein the chlorine and hydrogen chloride are absorbed by the melt, thereby avoiding the loss of such chlorine values. A more full understanding of such a processing expedient may be ascertained by reference to U.S. application Ser. No. 95,030 filed in the name of Morgan C. Sze and Herbert Riegel, on Dec. 4, 1970 and to U.S. Pat. No. 3,548,016.

It is to be understood that the hereinabove described embodiment is equally applicable to the production of vinyl chloride from ethyl chloride. In such an embodiment, the fresh feed to reactor 15 does not include ethane and chlorine and/or hydrogen chloride and the recycle stream recovered as overhead from column 69 includes ethylene and hydrogen chloride.

It is also to be understood that although the embodiment has been particularly described with respect to the use of ethane as fresh feed, the hydrocarbon feed could also contain some ethylene, although the primary component is ethane. For example, the ethane feed could be obtained from a refinery, in which case, the ethane feed would also contain some ethylene and/or methane and/or propane.

Numerous modifications and variations of the hereinabove described embodiment are possible within the spirit and scope of the present invention. Thus, for example, in some cases the feed to the chlorinator may include some fresh ethylene as well as recycle ethylene.

As a further alternative, the temperature regulation of the melt may be provided by controlling the temperature of the lift gas used for transferring the melt, in which case, the heat exchange vessel 20 could be eliminated.

Similarly, the separation and recovery of the various components may be effected in a manner other than as particularly described. Thus, for example, column 88 could be operated to produce an overhead stream comprising all remaining chlorinated hydrocarbons boiling below 1,2-dichloroethane, whereby the 1,1-dichloroethane is taken overhead with the ethyl chloride. Column 90 is then operated to recover, as overhead, ethyl chloride and 1,1-dichloroethane, the aforesaid overhead being recycled to the reactor 15.

As a further alternative, column 92 may be omitted, and the bottoms from column 88 (containing 1,2-dichloroethane and heavier components, or 1,1- and 1,2-dichloroethane and heavier components) fed directly to the dehydrochlorination reaction zone. In such an alternative embodiment, a further column would be provided for separating from the dehydrochlorination reaction effluent, those heavier components previously recovered as bottoms in column 92. The further column, however, could be of a smaller capacity than that required for column 92.

As still another alternative, the chlorination effluent and the dehydrochlorination effluent may be recovered in different separation and recovery zones.

It is also to be understood that one or more of the reaction intermediates may be recovered as a co-reaction product. Thus, for example, the dichloroethane could be recovered as a co-product thereby eliminating the dehydrochlorination reactor and associated equipment.

These modifications and others should be apparent to those skilled in the art from the teachings herein.

The invention will be further described with respect to the following example which further illustrates the present invention. It is to be understood, however, that the scope of the invention is not to be limited thereby.

EXAMPLE I

A copper chloride melt having the following composition is contacted in a first zone at a temperature of 474°C. with an oxygen-rich mixture comprised of 75 percent oxygen and 25 percent nitrogen to produce copper oxychloride:

| | |
|---|---|
| KCl | 30 wt % |
| CuCl | 37 wt % |
| CuCl$_2$ | 33 wt % |

The melt, now containing copper oxychloride, is contacted in a second zone with a mixed feed at the following conditions to produce the following products:

| | |
|---|---|
| Reaction Temperature | 474°C. |
| Reaction Pressure | 1 atm |
| Gas Hourly Space Velocity, GHSV | 65 |
| Feed Rate | 0.89 gm-mole/hr |
| Feed Rate, Mole Ratio Ethane/Ethylene/Ethyl Chloride/Chlorine | 3.2/0.8/0.9/1.0 |
| Conversions | |
| Ethane | 100% |
| Ethyl Chloride | 100% |

Products:

| Component | Mole % Product C |
|---|---|
| C$_2$H$_4$ | 22.1 |
| C$_2$H$_3$Cl | 40.6 |
| C$_2$H$_2$Cl$_2$ | 13.2 |
| C$_2$H$_4$Cl$_2$ | 0.6 |
| C$_2$H$_3$Cl$_3$ | 0.7 |
| C$_2$HCl$_3$ | 10.5 |
| C$_2$Cl$_4$ | 2.1 |
| Co and CO$_2$ | 10.1 |
| CH$_4$ | 0.1 |
| | 100.0 |

The ethyl chloride and ethylene product is recovered and recycled and the dichloroethane and vinyl chloride are recovered as products.

EXAMPLE II

A molten mixture comprising 30 wt percent potassium chloride, 54 wt percent cuprous chloride and 16 wt percent cupric chloride is contacted in a first zone at a temperature of 471°C. with a mixture of 75 percent oxygen and 25 percent nitrogen to produce copper oxychloride.

The melt, now containing copper oxychloride, is contacted in a second zone with ethyl chloride at the following conditions to produce the following products:

| | |
|---|---|
| Reaction Temperature | 471°C. |
| Reaction Pressure | 1 atm |
| Residence Time | 13 seconds |
| Gas Hourly Space Velocity, GHSV | 56 |
| Feed Rate | |
| Ethyl Chloride | 1.70 gm-mole/hr |
| Ethyl Chloride Conversion | 36.6% |

| Products: Components | Mole % C$_2$H$_5$Cl Converted |
|---|---|
| C$_2$H$_4$ | 44.3 |
| C$_2$H$_3$Cl | 10.3 |
| C$_2$H$_4$Cl$_2$ | 34.6 |
| C$_2$H$_2$Cl$_2$ | 5.4 |
| C$_2$H$_3$Cl$_3$ | 1.1 |
| C$_2$HCl$_3$ | 1.6 |
| C$_2$Cl$_4$ | 1.3 |
| Co and CO$_2$ | 1.4 |
| CH$_4$ | 0.0 |
| | 100.0 |

The ethyl chloride and ethylene recovered from the product may be recycled to the second zone and the vinyl chloride and dichloroethanes recovered as reaction product. Alternatively, dichloroethanes can be dehydrochlorinated to vinyl chloride.

EXAMPLE III

The following table is illustrative of operating conditions which may be employed in the embodiment illustrated in FIGS. 2 and 3 to produce vinyl chloride from ethane and chlorine, as fresh feed, at the rate of 155 million pounds per year. The dehydrochlorination reactor is a furnace, and the dehydrochlorination is effected thermally with a trace of chlorine. The symbol Σ indicates that the stated quantity is the total quantity of the compound including isomers.

TRANSCAT MATERIAL BALANCE

| STREAM | 12 | 10 | 13 | 28 | 31/93 | 32/83 | 33 | 34 | 45 | 46/95 | 57 | 86 | 94+96 |
|---|---|---|---|---|---|---|---|---|---|---|---|---|---|
| Temp. °F. | 300 | 825 | 850 | 100 | 100 | 100 | 100 | 100 | 230 | 950 | 950 | 100 | 100 |
| Total Lbs./Hr. | 43,222 | 7,423,705 | 7,432,185 | 34,742 | 11,539 | 21,214 | 14,342 | 10,080 | 65,759 | 28,293 | 28,247 | 18,694 | 4,434 |
| Component | | | | | | | | | | | | | |
| O$_2$ | 312 | | | 47 | | | | | | | | | |
| N$_2$ | 1180 | | | 1180 | | | | | 2 | | | | |
| CO | | | | | | 2 | | | 8 | | | | |
| CO$_2$ | | | | | | | 202 | | | | | | |
| Cl$_2$ | | | | | | | | | 6 | | 162 | | |
| HCl | | | | | 162 | | | | 514 | | | | |
| H$_2$O | 11 | | | 11 | | | | | 206 | | | | |
| C$_2$H$_4$ | | | | | 206 | | | | | | | | |
| C$_2$H$_6$ | | | | | 311 | | 336 | 311 | | | | | |

TRANSCAT MATERIAL BALANCE – Continued

| STREAM | 12 | 10 | 13 | 28 | 31/93 | 32/83 | 33 | 34 | 45 | 46/95 | 57 | 86 | 94+96 |
|---|---|---|---|---|---|---|---|---|---|---|---|---|---|
| Temp. °F. | 300 | 825 | 850 | 100 | 100 | 100 | 100 | 100 | 230 | 950 | 950 | 100 | 100 |
| Total Lbs./Hr. | 43,222 | 7,423,705 | 7,432,185 | 34,742 | 11,539 | 21,214 | 14,342 | 10,080 | 65,759 | 28,293 | 28,247 | 18,694 | 4,434 |
| Component | | | | | | | | | | | | | |
| $C_2H_2$ | | | | | | | 1 | | | 1 | | | |
| $C_2H_3Cl$ | | | | | 2 | 2 | | | | 142 | 161 | 299 | |
| $C_2H_5Cl$ | | | | | 142 | | | | | 142 | | 0.1 | |
| $\Sigma C_2H_2Cl_2$ | | | | | 8 | | | | | 20 | 5 | 6 | 13 |
| $\Sigma C_2H_4Cl_2$ | | | | | 15 | | | | | 181 | 274 | 111 | 3 |
| $\Sigma C_2H_3Cl_3$ | | | | | | | | | | 10 | | 1 | 11 |
| $C_2HCl_3$ | | | | | | | | | | 1 | 4 | 4 | 1 |
| $C_3H_6Cl_2$ | | | | | | | | | | 1 | | | 1 |
| $C_2Cl_4$ | | | | | | | | | | 7 | | | 7 |
| $CCl_4$ | | | | | | | | | | 1 | 1 | | |
| CuO | | | 530 | | | | | | | | | | |
| CuCl | | 41,960 | 40,900 | | | | | | | | | | |
| $CuCl_2$ | | 11,570 | 12,100 | | | | | | | | | | |
| KCl | | 23,000 | 23,000 | | | | | | | | | | |

It is to be understood that the chlorides of iron, cobalt, manganese and chromium can be used in the hereinabove examples instead of copper chlorides.

The process of the present invention provides an effective method of producing vinyl chloride from ethane and/or ethyl chloride, preferably ethane. In accordance with the present invention, unreacted feed and intermediate reaction products are effectively converted to vinyl chloride without any significant loss of chlorine values, thereby providing a very economic process.

Numerous modifications and variations of the present invention are possible in light of the above teachings and, therefore, within the scope of the appended claims the invention may be practised other than as particularly described.

What is claimed is:

1. A process for producing vinyl chloride comprising:
   a. contacting, in the vapor phase ethane and a member selected from the group consisting of hydrogen chloride, chlorine and mixtures thereof as fresh feed and unconverted ethane, ethyl chloride and ethylene as recycle components with a molten mixture comprising a multivalent metal chloride in both its higher and lower valence state and the oxychloride of the metal, to produce a reaction effluent comprising vinyl chloride, dichloroethane and said recycle components;
   b. recovering from the reaction effluent the vinyl chloride, dichloroethane and said recycle components; and
   c. passing recovered recycle components to step (a).

2. The process as defined in claim 1 wherein the contacting of step (a) is effected at a temperature from about 700°F. to about 1200°F.

3. The process as defined in claim 2 wherein the molten mixture further comprises a metal chloride melting point depressant which is non-volatile and resistant to the action of oxygen to maintain the molten state at the reaction temperature.

4. The process as defined in claim 2 wherein the molten mixture further comprises as a melting point depressant, a metal chloride of a metal selected from the group consisting of the alkali metals, silver, zinc and thallium.

5. The process as defined in claim 4 wherein the melting point depressant is an alkali metal chloride.

6. The process as defined in claim 3 wherein the multivalent metal chloride is a chloride of a metal selected from the group consisting of manganese, copper, iron, chromium and cobalt.

7. The process as defined in claim 3 wherein the multivalent metal chlorides and oxychloride are cupric chloride, cuprous chloride and copper oxychloride, respectively.

8. The process as defined in claim 7 wherein the weight ratio of recycle ethyl chloride to fresh ethane feed in step (a) of claim 1 is from about 0.3:1 to about 14:1.

9. The process as defined in claim 8 wherein the molten mixture contains from about 16 percent to about 50 percent, by weight, of cupric chloride.

10. The process as defined in claim 9 wherein the molten mixture contains from about 0.5 percent to about 5.5 percent, by weight, of copper oxychloride.

11. The process as defined in claim 10 wherein the weight ratio of recycle ethylene to fresh ethane feed in step (a) of claim 1 is from about 0.03:1 to about 1.2:1.

12. The process as defined in claim 11 wherein the molten mixture further includes as a melting point depressant potassium chloride to maintain the molten state at the reaction temperature.

13. The process as defined in claim 12 wherein the potassium chloride is present in an amount from about 20 percent to about 40 percent, by weight, of the molten mixture.

14. A process for producing vinyl chloride comprising:
   a. contacting, in the vapor phase, ethane and a member selected from the group consisting of hydrogen chloride, chlorine and mixtures thereof as fresh feed and unconverted ethane, ethyl chloride and ethylene as recycle components with a molten mixture comprising a multivalent metal chloride in both its higher and lower valence state and the oxychloride of the metal, to produce a reaction effluent comprising vinyl chloride, dichloroethane and said recycle components;
   b. recovering from the reaction effluent the vinyl chloride, dichloroethane and said recycle components;
   c. passing recovered recycle components to step (a);
   d. dehydrochlorinating recovered dichloroethane to vinyl chloride; and
   e. recovering vinyl chloride from the dehydrochlorination.

15. The process as defined in claim 14 wherein the contacting of step (a) is effected at a temperature from about 700°F. to about 1200°F.

16. The process as defined in claim 15 wherein the molten mixture further comprises a metal chloride melting point depressant which is non-volatile and resistant to the action of oxygen to maintain the molten state at the reaction temperature.

17. The process as defined in claim 15 wherein the molten mixture further comprises as a melting point depressant, a metal chloride of a metal selected from the group consisting of the alkali metals, silver, zinc and thallium.

18. The process as defined in claim 17 wherein the melting point depressant is an alkali metal chloride.

19. The process as defined in claim 16 wherein the multivalent metal chloride is a chloride of a metal selected from the group consisting of manganese, copper, iron, chromium and cobalt.

20. The process as defined in claim 16 wherein the multivalent metal chlorides and oxychloride are cupric chloride, cuprous chloride and copper oxychloride, respectively.

21. A process for producing vinyl chloride, comprising:
   a. contacting a vapor feed comprising ethane and a member selected from the group consisting of chlorine, hydrogen chloride and mixtures thereof as fresh feed, in addition to unconverted ethane, ethylene, hydrogen chloride and ethyl chloride, as recycle, with a molten mixture comprising a multivalent metal chloride in both its higher and lower valence state and the oxychloride of the metal, to produce a reaction effluent comprising ethylene, vinyl chloride, dichloroethane, ethyl chloride and unconverted ethane;
   b. recovery from the reaction effluent and recycling to step (a) unconverted ethane, ethylene and ethyl chloride;
   c. recovering vinyl chloride from the reaction effluent;
   d. recovering dichloroethane from the reaction effluent and dehydrochlorinating the dichloroethane to vinyl chloride and hydrogen chloride;
   e. recovering the vinyl chloride from the dehydrochlorination; and
   f. recovering hydrogen chloride produced in the dehydrochlorination and passing recovered hydrogen chloride to step (a).

22. The process as defined in claim 21 wherein the contacting of step (a) is effected at a temperature from about 700°F. to about 1200°F.

23. The process as defined in claim 22 wherein the molten mixture further comprises a melting point depressant to maintain the molten state at the reaction temperature, said melting point depressant being a chloride of metal selected from the group consisting of the alkali metals, zinc, silver and thallium.

24. The process as defined in claim 23 wherein the metal chloride melting point depressant is an alkali metal chloride.

25. The process as defined in claim 23 wherein the multivalent metal chloride is a chloride of a metal selected from the group consisting of copper, chromium, cobalt, manganese and iron.

26. The process as defined in claim 23 wherein the multivalent metal chlorides and oxychloride are cupric chloride, cuprous chloride and copper oxychloride, respectively.

27. A process for producing vinyl chloride, comprising:
   a. contacting a molten mixture comprising cuprous chloride and cupric chloride with a molecular oxygen-containing gas to produce copper oxychloride;
   b. contacting a vapor feed comprising ethane and a member selected from the group consisting of chlorine, hydrogen chloride and mixtures thereof as fresh feed, in addition to unconverted ethane, ethylene, hydrogen chloride and ethyl chloride, as recycle, with the molten mixture from step (a) to produce a reaction effluent comprising ethylene, vinyl chloride, dichloroethane, ethyl chloride and unconverted ethane;
   c. recovering from the reaction effluent and recycling to step (b) unconverted ethane, ethylene, and ethyl chloride;
   d. recovering vinyl chloride from the reaction effluent;
   e. recovering dichloroethane from the reaction effluent and dehydrochlorinating recovered dichloroethane to vinyl chloride and hydrogen chloride;
   f. recovering the vinyl chloride from the dehydrochlorination; and
   g. recovering hydrogen chloride produced in the dehydrochlorination and passing recovered hydrogen chloride to step (b).

28. The process as defined in claim 27 wherein the contacting of step (a) is effected at a temperature from about 600°F. to about 900°F. and the contacting of step (b) is effected at a temperature from about 700°F. to about 1200°F.

29. The process as defined in claim 28 wherein the molten mixture also includes as a melting point depressant a metal chloride to maintain the molten state at the reaction temperature, said metal chloride being a chloride of metal selected from the group consisting of alkali metals, zinc, silver and thallium.

30. The process as defined in claim 29 wherein the weight ratio of recycle ethyl chloride to fresh ethane feed in step (b) is from about 0.3:1 to about 14:1.

31. The process as defined in claim 30 wherein the molten mixture contains from about 16 percent to about 50 percent, by weight, of cupric chloride.

32. The process as defined in claim 31 wherein the molten mixture from step (a) contains from about 0.5 percent to about 5.5 percent, by weight, of copper oxychloride.

33. The process as defined in claim 32 wherein the weight ratio of recycle ethylene to fresh ethane feed in step (b) is from about 0.03:1 to about 1.2:1.

34. The process as defined in claim 28 wherein the molten mixture further includes as a melting point depressant potassium chloride to maintain the molten state at the reaction temperature.

35. The process as defined in claim 34 wherein the potassium chloride is present in an amount from about 20 percent to about 40 percent, by weight, of the molten mixture.

36. The process as defined in claim 35 wherein the molten mixture contains from about 16 percent to about 50 percent, by weight, of cupric chloride.

37. The process as defined in claim 36 wherein the molten mixture from step (a) contains from about 0.5 percent to about 5.5 percent, by weight, of copper oxychloride.

38. The process as defined in claim 37 wherein the weight ratio of recycle ethylene to fresh ethane feed in step (b) is from about 0.03:1 to about 1.2:1 and the weight ratio of recycle ethyl chloride to fresh ethane in step (b) is from about 0.3:1 to about 14:1.

39. A continuous process for producing vinyl chloride, comprising:

a. contacting in a first reaction zone a vapor feed comprising, as fresh feed, ethane and a member selected from the group consisting of chlorine, hydrogen chloride and mixtures thereof and as recycle, unconverted ethane, ethylene, hydrogen chloride and ethyl chloride, with a molten mixture comprising cuprous chloride, cupric chloride, copper oxychloride and potassium chloride, said contacting being effected at a temperature from about 700°F. to about 1200°F.;

b. withdrawing a first gaseous effluent from the first reaction zone comprising ethane, ethylene, vinyl chloride, dichloroethane and ethyl chloride;

c. recovering from the first gaseous effluent and recycling to the first reaction zone ethane, ethylene and ethyl chloride;

d. recovering vinyl chloride from the first gaseous effluent as reaction product;

e. recovering dichloroethane from the first gaseous effluent and introducing recovered gaseous dichloroethane into a second reaction zone wherein the dichloroethane is dehydrochlorinated at a temperature from about 700°F. to about 1200°F. to vinyl chloride;

f. withdrawing a second gaseous effluent, comprising vinyl chloride and hydrogen chloride from the second reaction zone and recovering therefrom as reaction product vinyl chloride;

g. recovering hydrogen chloride from the second gaseous effluent and passing recovered hydrogen chloride to step (a);

h. contacting in a third reaction zone melt recovered from step (a) with gaseous molecular oxygen, said contacting being effected at a temperature from about 600°F. to about 900°F. to produce copper oxychloride; and i. passing melt from step (h) to step (a) as said molten mixture.

40. The process as defined in claim 39 wherein the dichloroethane contained in the first gaseous effluent comprises 1,1-dichloroethane and 1,2-dichloroethane, said recovered dichloroethane introduced into the second reaction zone being 1,2-dichloroethane, said 1,1-dichloroethane being recovered and passed to step (a) for dehydrochlorination to vinyl chloride.

* * * * *